United States Patent
Gunnarsson et al.

(10) Patent No.: US 8,838,090 B2
(45) Date of Patent: *Sep. 16, 2014

(54) AUTOMATIC DETECTION AND CORRECTION OF PHYSICAL CELL IDENTITY CONFLICTS

(75) Inventors: Fredrik Gunnarsson, Linköping (SE); Bengt Lindoff, Bjärred (SE)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 1067 days.

This patent is subject to a terminal disclaimer.

(21) Appl. No.: 12/464,183

(22) Filed: May 12, 2009

(65) Prior Publication Data

US 2010/0178912 A1     Jul. 15, 2010

Related U.S. Application Data

(60) Provisional application No. 61/144,791, filed on Jan. 15, 2009.

(51) Int. Cl.
- *H04W 24/00* (2009.01)
- *H04W 24/02* (2009.01)
- *H04W 84/04* (2009.01)
- *H04W 24/10* (2009.01)

(52) U.S. Cl.
CPC ............ *H04W 24/02* (2013.01); *H04W 84/042* (2013.01); *H04W 24/10* (2013.01)
USPC ........... 455/423; 455/447; 455/415; 455/444; 455/446

(58) Field of Classification Search
USPC ................. 455/423, 447, 415, 438, 444, 446; 370/241, 252
See application file for complete search history.

(56) References Cited

U.S. PATENT DOCUMENTS

| | | | |
|---|---|---|---|
| 7,069,040 B2 | 6/2006 | Iwanaga et al. | |
| 7,394,801 B2 | 7/2008 | Lin | |

(Continued)

FOREIGN PATENT DOCUMENTS

| | | | |
|---|---|---|---|
| WO | 2008113373 | | 9/2008 |
| WO | WO2008/113373 | * | 9/2008 |
| WO | 2010/006298 A1 | | 1/2010 |

OTHER PUBLICATIONS

Y. Park and F. Adachi (eds.), "Enhanced Radio Access Technologies for Next Generation Mobile Communication," 2007, excerpt concerning the cell search procedures in Chapter 7 (pp. 253-255), ISBN: 978-1-4020-5531-7.

Amirijoo et al., "Neighbor Cell Relation List and Measured Cell Identity Management in LTE," Network Operations and Management Symposium, Apr. 7, 2008, pp. 152-159, IEEE, Piscataway, NJ, US.

(Continued)

*Primary Examiner* — Charles Shedrick
(74) *Attorney, Agent, or Firm* — Coats and Bennett, PLLC

(57) ABSTRACT

A PCID conflict resolution procedure is implemented with the aid of a user terminal that is capable of detecting and reporting PCID conflicts between two neighboring neighbor cells. A base station in a serving cell configures measurement reporting by user terminals within the cell capable of reporting PCID conflicts. Once measurement reporting by one or more user terminals is configured, the base station will receive measurement reports from the capable user terminals. If a capable user terminal detects a PCID conflict, the user terminal will include an indication of the PCID conflict in the measurement report. When the base station receives a measurement report with an indication of a PCID conflict, the base station implements an autonomous PCID conflict resolution to resolve the PCID conflict.

25 Claims, 9 Drawing Sheets

(56) References Cited

U.S. PATENT DOCUMENTS

| | | | |
|---|---|---|---|
| 8,520,617 B2* | 8/2013 | Krishnamurthy et al. | 370/329 |
| 8,571,553 B2* | 10/2013 | Prakash et al. | 455/435.2 |
| 2006/0121907 A1* | 6/2006 | Mori et al. | 455/447 |
| 2007/0064642 A1 | 3/2007 | Watabe et al. | |
| 2007/0291730 A1* | 12/2007 | Monfet et al. | 370/350 |
| 2008/0039141 A1* | 2/2008 | Claussen et al. | 455/561 |
| 2008/0101511 A1 | 5/2008 | Lindoff et al. | |
| 2009/0023464 A1* | 1/2009 | Prakash et al. | 455/501 |
| 2009/0047955 A1* | 2/2009 | Frenger et al. | 455/436 |
| 2009/0047956 A1* | 2/2009 | Moe et al. | 455/436 |
| 2009/0047968 A1* | 2/2009 | Gunnarsson et al. | 455/446 |
| 2009/0197606 A1* | 8/2009 | Bergman et al. | 455/438 |
| 2009/0245203 A1* | 10/2009 | Pani et al. | 370/331 |
| 2010/0008235 A1* | 1/2010 | Tinnakornsrisuphap et al. | 370/241 |
| 2010/0020710 A1* | 1/2010 | Gupta et al. | 370/252 |
| 2010/0105395 A1* | 4/2010 | Ji et al. | 455/444 |
| 2010/0267373 A1* | 10/2010 | Engstr m | 455/415 |
| 2011/0110251 A1* | 5/2011 | Krishnamurthy et al. | 370/252 |
| 2012/0083263 A1* | 4/2012 | Kim et al. | 455/423 |
| 2012/0165022 A1* | 6/2012 | Rimhagen et al. | 455/437 |
| 2012/0263032 A1* | 10/2012 | Prakash et al. | 370/216 |
| 2013/0100877 A1* | 4/2013 | Naslund et al. | 370/315 |

OTHER PUBLICATIONS

Huawei, "Detection of Conflicting Cell Identities," 3GPP TSG RAN WG3 Meeting #57bis, Oct. 8-11, 2007, pp. 1-3, 3rd Generation Partnership Project (3GPP), Sophia-Antipolis Cedex, France.

Ericsson, "MCI Conflict Detection and Resolution," 3GPP TSG-SA5 (Telecom Management), Meeting SA5#55, Aug. 27-31, 2007, pp. 1-4, 3rd Generation Partnership Project (3GPP), Sophia-Antipolis Cedex, France.

Nokia Siemens Networks, "Automatic Physical Cell ID Assignment," 3GPP TSG-SA5 (Telecom Management), Meeting SA5#60, Jul. 7-11, 2008, pp. 1-4, 3rd Generation Partnership Project (3GPP), Sophia-Antipolis Cedex, France.

Amirijoo et al, "Neighbor Cell Relation List and Physical Cell Identity Self-Organization in LTE," Wireless Access Networks, Ericsson Research, Ericsson AB, Sweden, 978-1-4244-2052-0/08, 2008 IEEE, pp. 37-41.

Feng, et al., "Self-Organizing Networks (SON) in 3GPP Long Term Evolution," Nomor Research GmbH, Munich, Germany, May 20, 2008, 15 pages.

R3-080812, Nokia Siemens Networks, Nokia, Solution(s) to the 36.902's Automated Configuration of Physical Cell Identity Use Case, 3GPP TSG-RAN WG3 Meeting #59-bis, Shenzen, China, Mar. 31-Apr. 3, 2008, 7 pages.

* cited by examiner

AUTOMATIC DETECTION AND CORRECTION OF PHYSICAL CELL IDENTITY CONFLICTS

RELATED APPLICATIONS

This application claims the benefit of U.S. Provisional Patent Application Ser. No. 61/144,791 filed Jan. 15, 2009, which is incorporated herein by reference.

BACKGROUND

The present invention relates generally to automatic assignment of physical cell identities in a mobile communication network and, more particularly, to the detection and correction of conflicts between physical cell identities for neighboring cells in a mobile communication network.

In a mobile communication network, the coverage of the network area is divided into a plurality of cells. Each cell is identified by a unique physical cell identifier (PCID), which is broadcast to the user terminals over a broadcast channel. The PCID enables the user terminals to differentiate between different cells when implementing cell search algorithms for mobility management purposes. Conventionally, a network administrator assigns the PCIDs to the cells so that neighboring cells do not have the same PCID.

One of the goals of the Long Term Evolution (LTE) standard currently being developed by the Third Generation Partnership Project (3GPP) is to simplify deployment of LTE networks. One way to simplify deployment is to make the network self-configuring in as many aspects as possible. Two related areas where self-configuration is being considered are automatic assignment of PCIDs and automatic generation of neighbor cell relation (NCR) lists.

When PCIDs are assigned without manual planning, there is some risk of PCID conflicts. A PCID conflict exits when two neighboring cells have the same PCID. Such conflicts could result in mobility management errors, such as dropped calls. Accordingly, a mechanism is needed to resolve such conflicts.

Most PCID conflicts will manifest themselves as ambiguities in NCR lists. Thus, a PCID conflict can be detected if one cell has two neighbors in the NCR list with the same PCID and Public Land Mobile Network Identity (PLMNID) on the same carrier frequency; but a different Global Cell Identity (GID). This method of detection requires a third cell to detect conflicts. Thus, cells with conflicting identities need help from on a third, common neighboring cell to detect the conflict. As a result, one or both cells must change its old conflicting PCID to a new PCID.

There are some circumstances when PCID conflicts will not be revealed in the NCR list and therefore not detected by a third cell. For example, in the case of a small isolated micro cell inside of a larger macro cell, there may not be a third cell that has both the micro cell and the macro cells as neighbors. Also, a third neighboring cell may not detect a PCID conflict when the conflicting cells are isolated (e.g., an island with only two cells). A "highway deployment" where several cells are aligned along a road such that each cell only has two neighbors may also prevent detection of the PCID conflict by a third cell.

PCID transmission gaps have been proposed as one method of detecting PCID conflicts in situations where the conflicts can not be detected as ambiguities in NCR lists. The basic idea is to stop transmitting all or some reference signals corresponding to the PCID at predefined (e.g., pseudo-random) times and to order the connected user terminals to try to detect during the gap if any other cell is transmitting reference symbols corresponding to the same PCID. During normal operation, there is no need to issue a reference signal transmission gap. The PCID is a static property of a cell that is initialized when the cell first goes into operation and then that value is typically never changed during the lifetime of the cell. Reference signal transmission gaps are therefore most useful in newly installed cells that need to verify that the initial PCID is locally non-colliding. Reference signal transmission gaps could however also be used infrequently (e.g., once a day) to verify that the used PCID is still locally non-colliding. Especially in small micro cells with few neighboring cells this might be a good safety measure.

SUMMARY

The present invention relates to the detection and resolution of PCID conflicts in a mobile communication network without human involvement. The PCID conflict resolution procedure is implemented with the aid of a user terminal that is capable of detecting and reporting PCID conflicts between two neighboring neighbor cells. The base station in a serving cell configures signal quality measurement reporting by the user terminals within the cell. Measurement reporting is configured by sending measurement control information on the downlink control channel to the user terminals. If a capable user terminal detects a PCID conflict, the user terminal will include an indication of the PCID conflict in the signal quality measurement report. When the base station receives a signal quality measurement report with an indication of a PCID conflict, the base station automatically (without human involvement) changes its PCID to resolve the PCID conflict.

According to one embodiment, the serving base station acquires the NCR lists from the neighbor cells in its own NCR lists and finds an unused PCID. If an unused PCID is found, the base station autonomously changes its own PCID or proposes a change of its own PCID to a central management node and waits for confirmation of the change. Alternatively, the base station may propose a change to a central management node and wait for approval to make the change. In another embodiment, the base station, responsive to the measurement report, sends a conflict notification to a central management node. In this embodiment, the central management node gathers information about used PCIDs from the serving cell and its neighbor cells and updates the NCR list of the serving cell and its neighbor cells.

DETAILED DESCRIPTION

Figure 1:
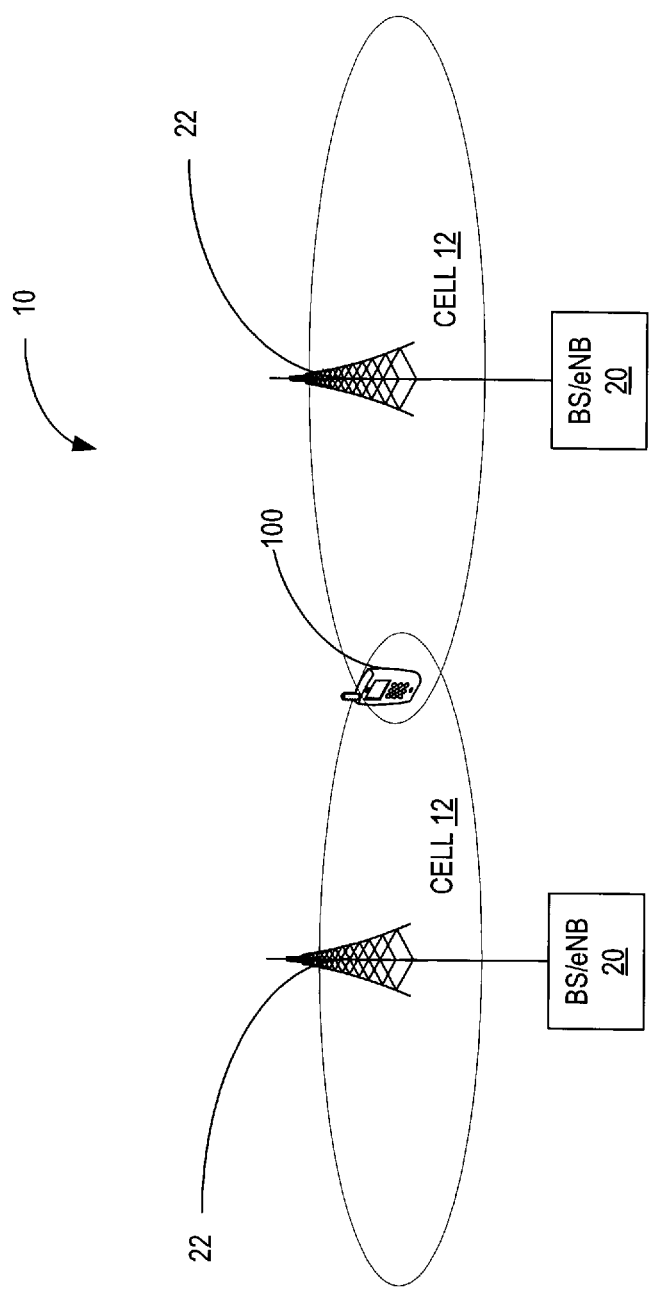
FIG. 1 illustrates an exemplary mobile communication network having a centralized antenna for each cell.

Referring now to the drawings, the present invention will be described in the context of a mobile communication network configured according to the Long Term Evolution (LTE) standards currently being developed by the 3 rd Generation Partnership Project (3GPP). Those skilled in the art will appreciate, however, that the present invention may be implemented in mobile communication networks operating according to other standards, such as the Wideband Code Division Multiple Access (WCDMA) and WiMax standards.

FIG. 1 illustrates a conventional network architecture for a mobile communication network, indicated generally by the numeral 10. The coverage area of the mobile communication network 10 is divided into a plurality of cells 12. Each cell is assigned a locally unique physical cell identifier (PCID). A base station 20 associated with each cell 12, referred to as an enhanced Node B (eNB) in the LTE standard, provides service to user terminals 100 within the cell 12. The base station 20 transmits reference signals to the user terminals 100 within the cell 12. In LTE systems, the reference symbols are transmitted with a cell-specific frequency shift that corresponds with the PCID of the cell 12. The user terminals 100 use the reference symbols to measure the reference symbol received power (RSRP). These RSRP measurements are used for initial cell selection and handover.

A user terminal 100 in an LTE network periodically searches for neighboring cells 12 and measures the RSRP from the neighboring cells 12. If the RSRP measurements exceed a reporting threshold, the measurements along with the PCIDs of the detected cells are included in a measurement report sent to the base station 20. In some instances, the base station 20 may provide the user terminal 100 with a neighbor cell relation (NCR) list, which contains a list of PCIDs for neighboring cells to be monitored by the user terminal 100. The base station 20 determines when to execute the handover based on the signal strength measurements. Typically, a handover is executed when the RSRP from a neighboring cell 12 exceeds the RSRP from the serving cell 12 by a predetermined amount When the base station 20 receives the measurement report containing an unrecognized PCID, the base station 20 may request the user terminal 100 to read and report the Global Identifier (GID) and Public Land Mobile Network Identifier (PLMNID) of the detected neighbor cell. This information is transmitted in LTE systems as part of the System Information on the Downlink Shared Channel (DL-SCH). Once the base station 20 has obtained knowledge of the globally unique identifier (i.e., the combination of GID and PLMNID) of the newly detected neighbor cell 12, it can contact a central server (e.g., a domain name server, DNS, or similar network node) and obtain the remaining connectivity information it needs to setup a neighbor cell relation with the newly detected neighbor cell 12. A base station 20 can then detect PCID conflicts between two neighboring cells 12 in situations where the two neighbor cells 12 have the same PCID.

There may be circumstances where two cells 12 with conflicting PCIDs do not have any common neighbors. In this case, the PCID conflict will not be apparent from the NCR lists of the neighbor cells 12. The present invention provides a mechanism for detecting PCID conflicts even when there is no common neighbor for the two conflicting cells 12. A user terminal 100 is configured to detect the conflict between a serving cell 12 and a neighbor cell 12. If a conflict is detected, the user terminal 100 reports the conflict to the serving cell 12, and the serving cell 12 can take appropriate action to correct the conflict, e.g., by changing its PCID. In one embodiment, the base station 20 analyzes the NCR lists for neighbor cells 12 to identify an unused PCID. In other embodiments, the base station 20 may request a new PCID from a central management node.

The user terminal 100 may signal the PCID conflict in several ways. In one embodiment, an indication of the PCID conflict is included within a RSRP measurement report sent from the user terminal 100 to the serving base station 20. The measurement report may comprise a dedicated report configured by the serving base station 20 for the purpose of reporting PCID conflicts. The indication of a PCID conflict may comprise the inclusion of the serving cell's PCID in the measurement report. Alternatively, the base station 20 may configure an extended usage of conventional measurement reports for candidate cell reporting purposes. The indication of a PCID conflict may comprise the inclusion of a duplicate PCID in the measurement report. If the user terminal 100 detects a PCID conflict involving more than one candidate cell, it can include each detected conflicting cell in the measurement report, indicating the conflict by the inclusion of the serving cell PCID for each detected conflicting cell.

Figure 2:
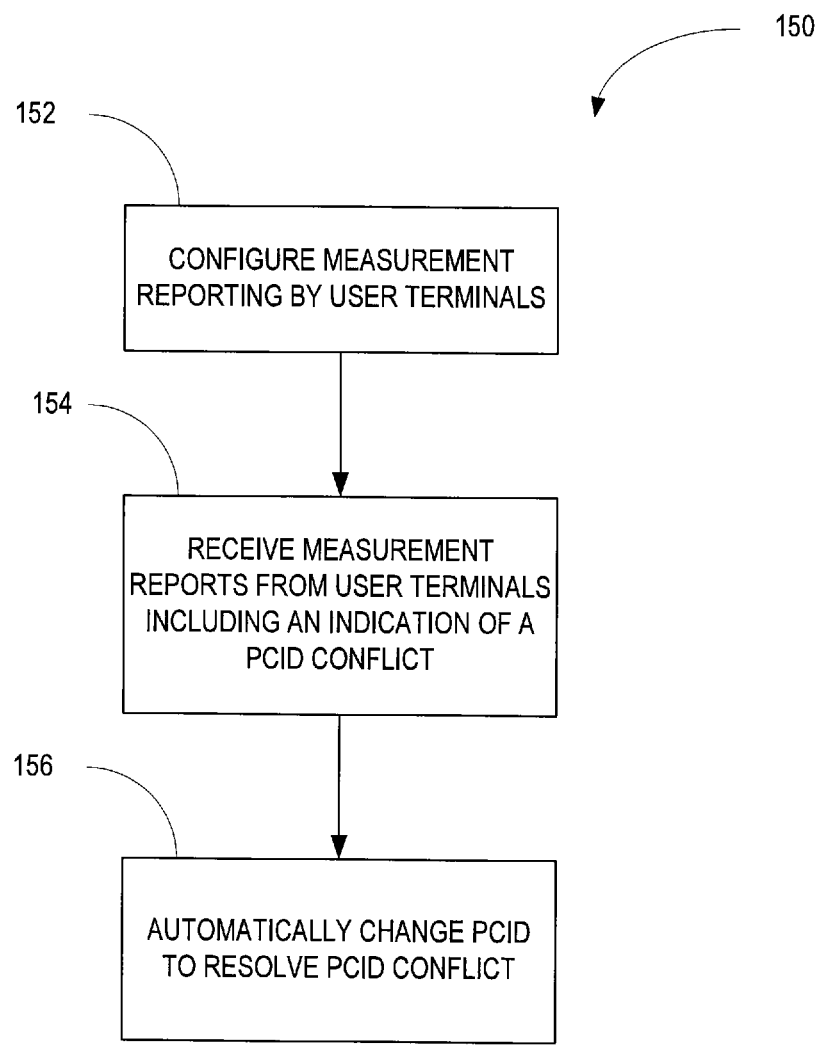
FIG. 2 illustrates an exemplary method of resolving cell identifier conflicts according to one embodiment of the present invention.

FIG. 2 illustrates an exemplary method 150 of detecting and resolving cell identifier conflicts according to one embodiment of the present invention. Method 150 is implemented by a serving base station 20 with the aid of a user terminal 100 that is capable of detecting and reporting PCID conflicts between a serving cell 12 and a neighbor cell 12 as described in more detail below. The base station 20 in the serving cell 12 configures measurement reporting by the user terminals 100 within the cell 12 (block 152). Measurement reporting is configured by sending measurement control information on the downlink control channel to the user terminals 100. The measurement control information may be sent over a dedicated channel or a common control channel.

In one exemplary embodiment, base station 20 configures a general measurement rule wherein the user terminals 100 report RSRP measurements for candidate cells when the difference between the candidate cell measurement and the serving cell measurement exceeds a predetermined threshold. The base station 20 may also configure the number of measurements to be reported. For example, the user terminal 100 may be configured to report measurements for up to N candidate cells 12, where N represents the maximum number of cells 12 reported. In general, a measurement report is triggered if the measurements for the candidate cell with the most favorable conditions exceed the reporting threshold. Once measurement reporting is triggered, the user terminal sends a measurement report for all candidate cells and includes the PCID of any conflicting cell that has been discovered. The inclusion of the conflicting PCID, which is the same as the serving cell PCID, indicates to the serving cell 12 that there is a PCID conflict. If the user terminal 100 is also configured to report measurements of the RSRP for the serving cell 12, then the user terminal 100 may be configured to include the duplicate PCID of the conflicting neighbor cell in the same measurement report to indicate the PCID conflict. Because the conflict is signaled within the measurement report, which is already being provided by the user terminal 100, no special signaling is need to indicate the conflict.

In a second embodiment, base station 20 may include an NCR list in the measurement control information. The NCR list may include the PCID of the serving cell 12 even though no known neighbor cell 12 uses the same PCID. The user terminal 100 considers the PCID of the serving cell 12 in the NCR list as a request or instruction to search for neighbor cells 12 having a conflicting PCID. The inclusion of the serving cell PCID in the NCR list may be conditioned on whether the base station 20 suspects that there is such a conflict, possibly determined by investigating mobility statistics e.g., such as drop rate and handover failure rate.

Although RSRP measurements are reported in the exemplary embodiment described herein, those skilled in the art will recognize that other signal quality measurements could be reported. For example, a user terminal 100 in LTE systems can be configured to report received symbol received quality. Also, other types of communication systems may use different nomenclature for signal quality measurements. An example is RSCP for WCDMA systems, which is similar to RSRP measurements in LTE. Also, signal to noise ratios (e.g., Ec/No, SIR, SINR), channel quality, and/or path loss could be reported in the measurement report.

Once measurement reporting by one or more user terminals 100 is configured, base station 20 will receive measurement reports from the capable user terminals 100. If a capable user terminal 100 detects a PCID conflict, the user terminal 100 will include an indication of the PCID conflict in the measurement report. When the base station 20 receives a measurement report with an indication of a PCID conflict (block 154), the base station 20 implements autonomous PCID conflict resolution to resolve the PCID conflict (block 156). According to one embodiment, the serving base station 20 acquires the NCR lists from the neighbor cells in its own NCR lists and finds an unused PCID. If an unused PCID is found, the base station 20 may autonomously change its own PCID or propose a change of its own PCID to a central management node and wait for confirmation of the change. In another embodiment, the base station 20, responsive to the measurement report, sends a conflict notification to a central management node. In this embodiment, the central management node gathers information about used PCIDs from the serving cell 12 and its neighbor cells 12 and updates the NCR list of the serving cell 12 and its neighbor cells 12.

Figure 3:
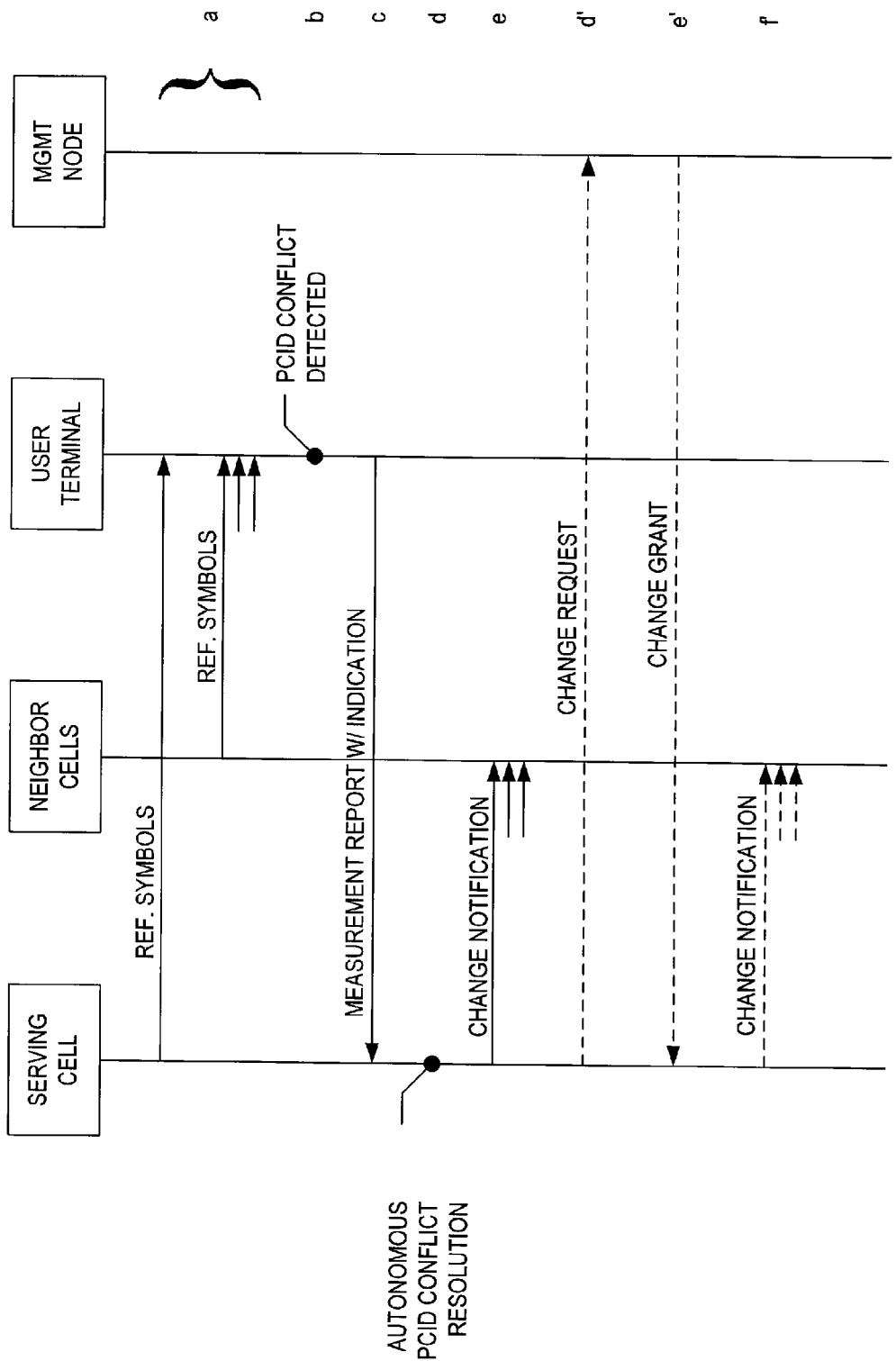
FIG. 3 illustrates an exemplary PCID conflict resolution procedure according to one embodiment where the serving base station selects a new PCID or alternatively, requests a new PCID from a central management node.

FIG. 3 shows a procedure illustrating how PCID conflicts are resolved according to one embodiment of the present invention. It is assumed that measurement reporting has previously been configured by the base station 20 as previously described. The base station 20 in the serving cell 12 and neighbor cells 12 transmit reference symbols to the user terminal 100, which are used by the user terminal 100 to perform RSRP measurements (step a). A user terminal 100 detects a PCID conflict (step b) and sends a measurement report with a PCID conflict indication to the serving base station 20 (step c). In response to the measurement report with a conflict indication, the base station 20 in the serving cell 12 automatically (without human involvement) changes its PCID to resolve the PCID conflict. In one embodiment, base station 20 implements an autonomous conflict resolution procedure (step d). As previously noted, the base station 20 in the serving cell 12 may acquire the NCR list of each neighbor cell 12 in its own neighbor list and find an unused PCID. After selecting an unused PCID, the base station 20 in the serving cell 12 may change its PCID and send a change notification to the neighbor cells 12 so that the neighbor cells 12 can update their own NCR list (step e).

In an alternative embodiment, the serving cell 12 may propose a change of its own PCID by sending a change request to a central management node (step d'). If the central management node approves its change, it sends a change grant message to the serving cell 12 (step e'). The serving cell 12 then sends a change notification to the neighbor cells 12 (step f').

Figure 4:
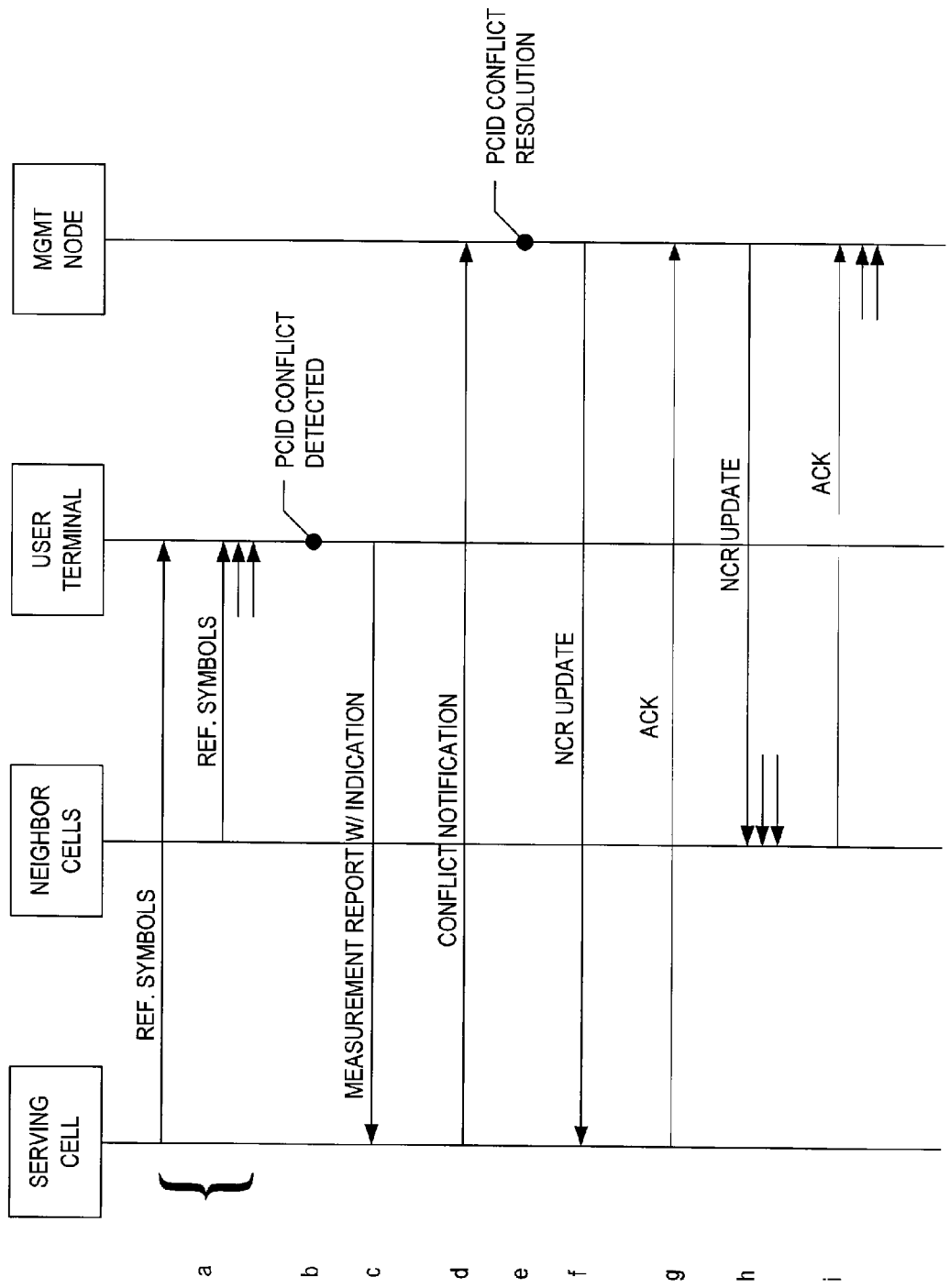
FIG. 4 illustrates an exemplary PCID conflict resolution procedure according to another embodiment where the base station reports the PCID conflict to a central management node and the central management node resolves the PCID conflict.

FIG. 4 shows a procedure illustrating how PCID conflicts are resolved in one embodiment. It is presumed that measurement reporting has previously been configured by the serving base station 20. The base station 20 in the serving cell 12 and the base stations 20 in neighboring cells 12 transmit reference symbols to the user terminal 100 to enable the user terminal 100 to perform RSRP measurements (step a). The user terminal 100 detects a PCID conflict (step b) and sends a measurement report with a PCID conflict indication to the serving cell 12 (step c). In this embodiment, the serving base station 20, in response to the measurement report, sends a conflict notification to a central management node (step d). The central management node executes a PCID conflict resolution procedure (step e). More specifically, the central management node searches for an unused PCID. After selecting an unused PCID, the central management node updates the neighbor cell relationship for the serving cell 12 and sends an NCR update message to the serving cell 12 (step f). The base station 20 in the serving cell 12 updates its NCR list and sends an acknowledgement to the central management node (step g). After receiving the acknowledgement from the serving cell 12, the central management node sends an NCR update message to the neighbor cells 12 of the serving cell 12 (step h). The neighbor cells 12 update their own NCR list and send an acknowledgement to the central management node (step i) to complete the process.

Figure 5:
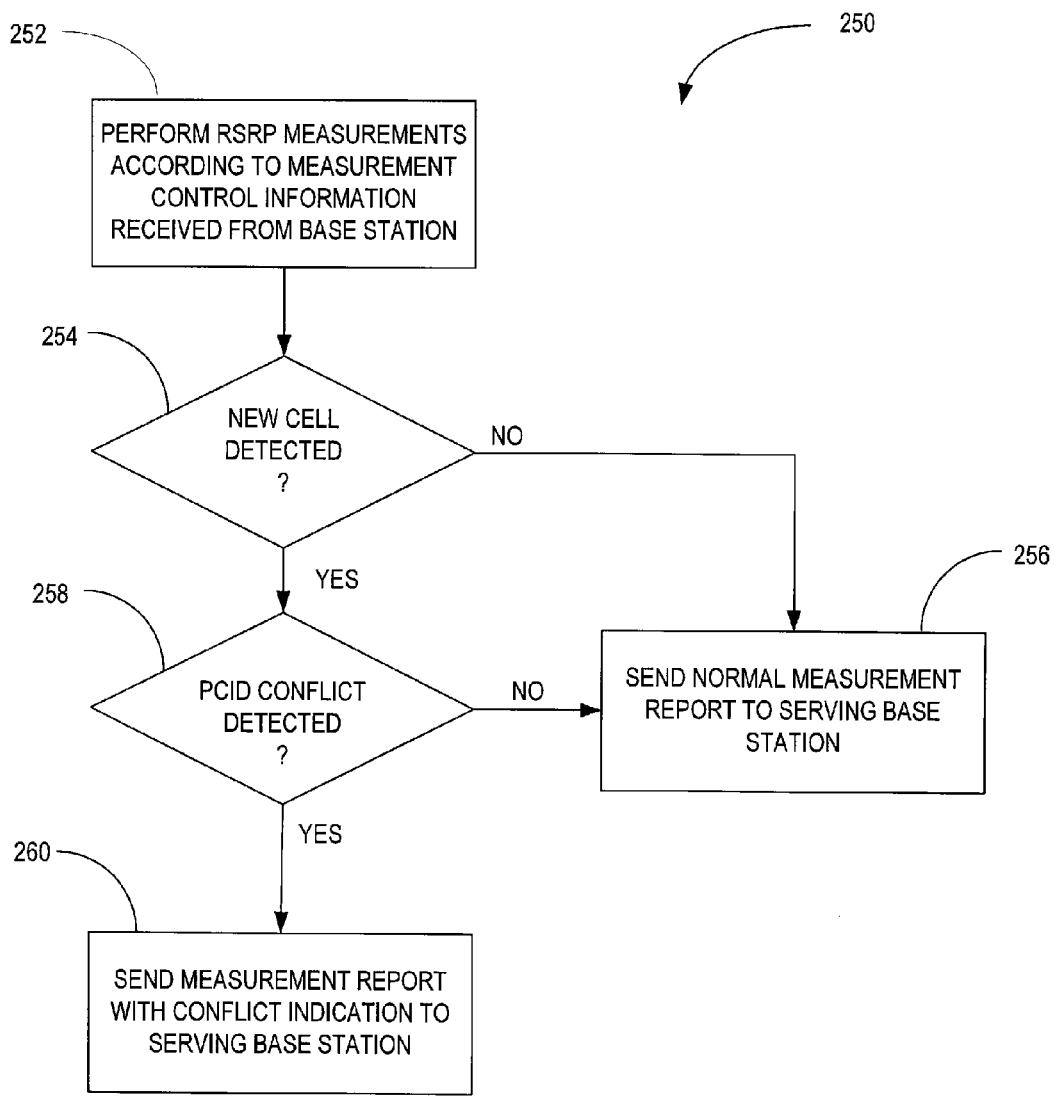
FIG. 5 illustrates an exemplary measurement reporting procedure implemented by a user terminal for reporting PCID conflicts.

FIG. 5 illustrates an exemplary method 250 implemented by a user terminal 100 to support PCID conflict resolution. The user terminal 100 performs a periodic RSRP measurement according to measurement control information received from the base station 20 (block 252). After making the measurement, the user terminal 100 determines whether a new cell 12 was detected since the last measurement report (block 254). If not, the user terminal 100 sends a normal measurement report to the serving base station 20 (block 256). If a new cell 12 is detected, user terminal 100 determines whether there is a PCID conflict with a previously known cell (block 258). A PCID conflict may be detected, for example, if the user terminal 100 detects signals from two different cells transmitting the same PCID. If a PCID conflict is detected, the user terminal 100 sends a measurement report with a conflict indication to the serving base station 20 (block 260). If the user terminal 100 does not ordinarily report measurements for the serving cell 12, the conflict indication may be given by including the PCID of the serving cell in the measurement report. The base station 20 will interpret the reported measurement as a conflict indication and implement the PCID conflict resolution procedure. If the user terminal 100 also reports measurements for the serving cell 12, the PCID conflict may be indicated by including the duplicate PCID of the neighbor cell 12 in the measurement report. The presence of the duplicate PCID will be interpreted by the base station 20 as a conflict indication. If no PCID conflict is detected, user terminal 100 sends a normal measurement report to the serving base station 20 (block 256).

In some embodiments, the base station 20 can be configured to perform PCID conflict resolution only when the RSRP measurements for the conflicting cell exceeds the reporting threshold. As an example, consider the situation where the base station 20 receives a measurement report containing the PCID and corresponding RSRP measurements for cell A, B, and C, where the measurement for cell A triggered the report and the measurements for cells B and C are below the reporting threshold. Further assume that the PCID for cell C is the same for the serving cell. In this case, the base station 20 may ignore the PCID conflict indication because the RSRP measurement for cell C is below the reporting threshold. On the other hand, if the RSRP measurement for cell C exceeds the reporting threshold or triggered the measurement report, the base station 20 may perform the PCID conflict resolution procedure.

In other embodiments of the invention, the base station 20 can be configured to determine relevance of the PCID conflict before initiating PCID conflict resolution in situations where the measurements associated with the conflicting PCID are lower than the reporting threshold. For example, the base station could start a counter or increment a counter each time a conflicting PCID is reported, and automatically change the PCID when the count reaches a predetermined value. The value of the counter may be decremented at predetermined time intervals, but never below zero.

Figure 6:
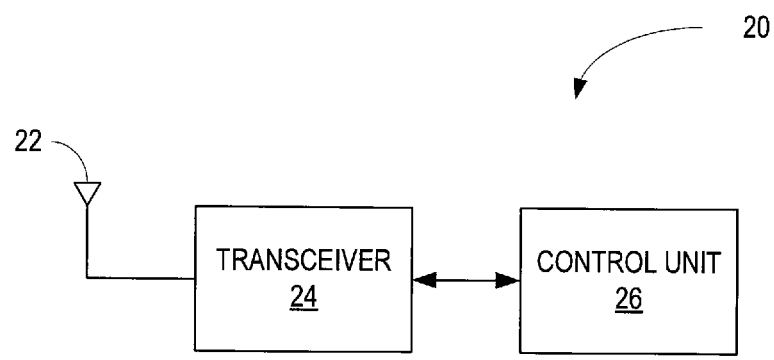
FIG. 6 illustrates an exemplary base station for resolving PCID conflicts.

FIG. 6 illustrates an exemplary base station 20 for implementing the PCID conflict resolution procedure as described above. Base station 20 includes one or more antennas 22 connected to a transceiver 24, and a control unit 26. Transceiver 24 transmits signals to, and receives signals from, a plurality of user terminals 100 within a cell 12. The transceiver 24 may operate according to any communication standard now known or later developed, such as the LTE standard. Control unit 26 controls the operation of the base station 20. The control unit 26 may comprise one or more processors, microcontrollers, hardware, or a combination thereof, which is programmed and configured to operate as here and above described.

Figure 7A:
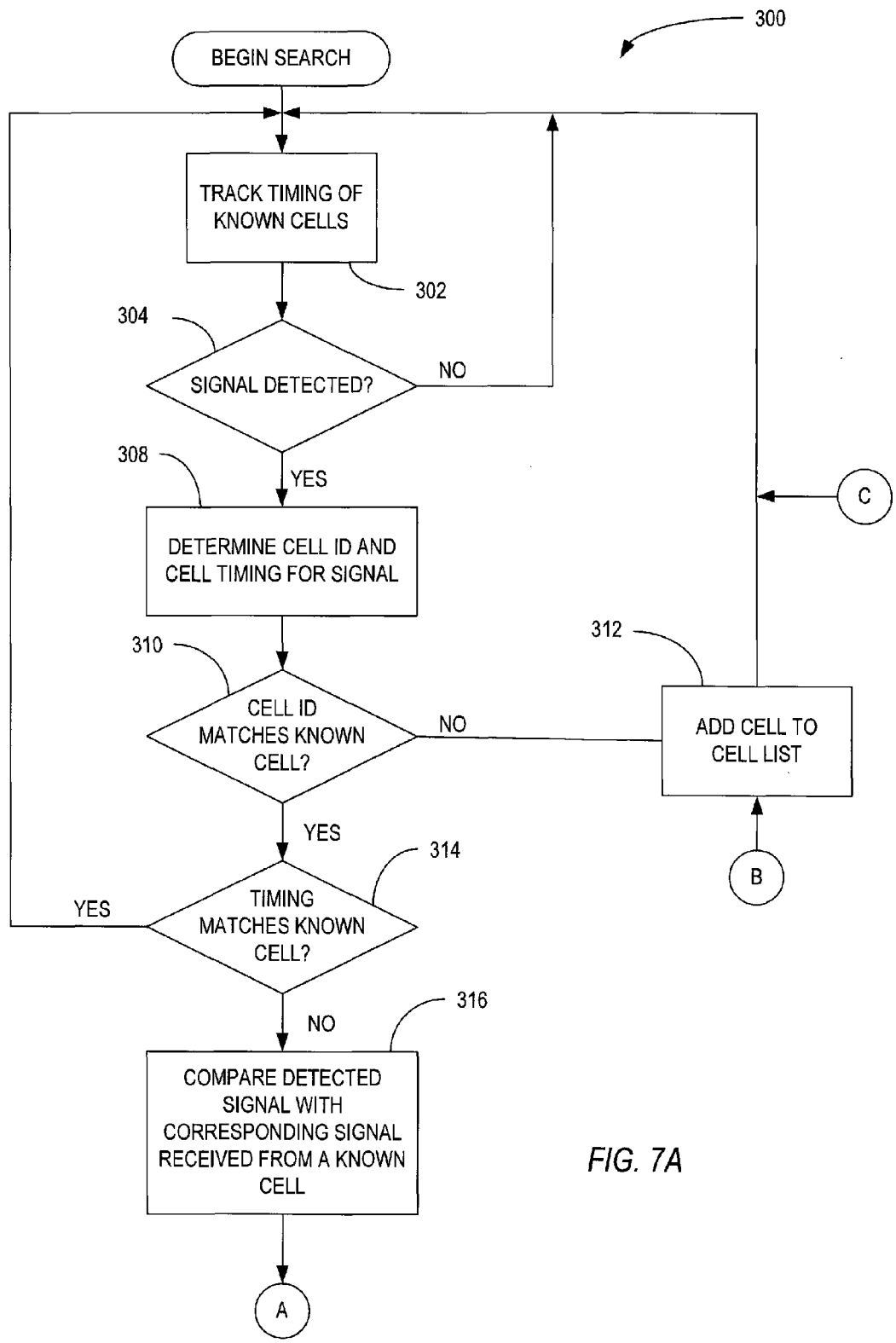
FIGS. 7A and 7B illustrate an exemplary method implemented by a user terminal for detecting PCID conflicts between two neighboring cells.
Figure 7B:
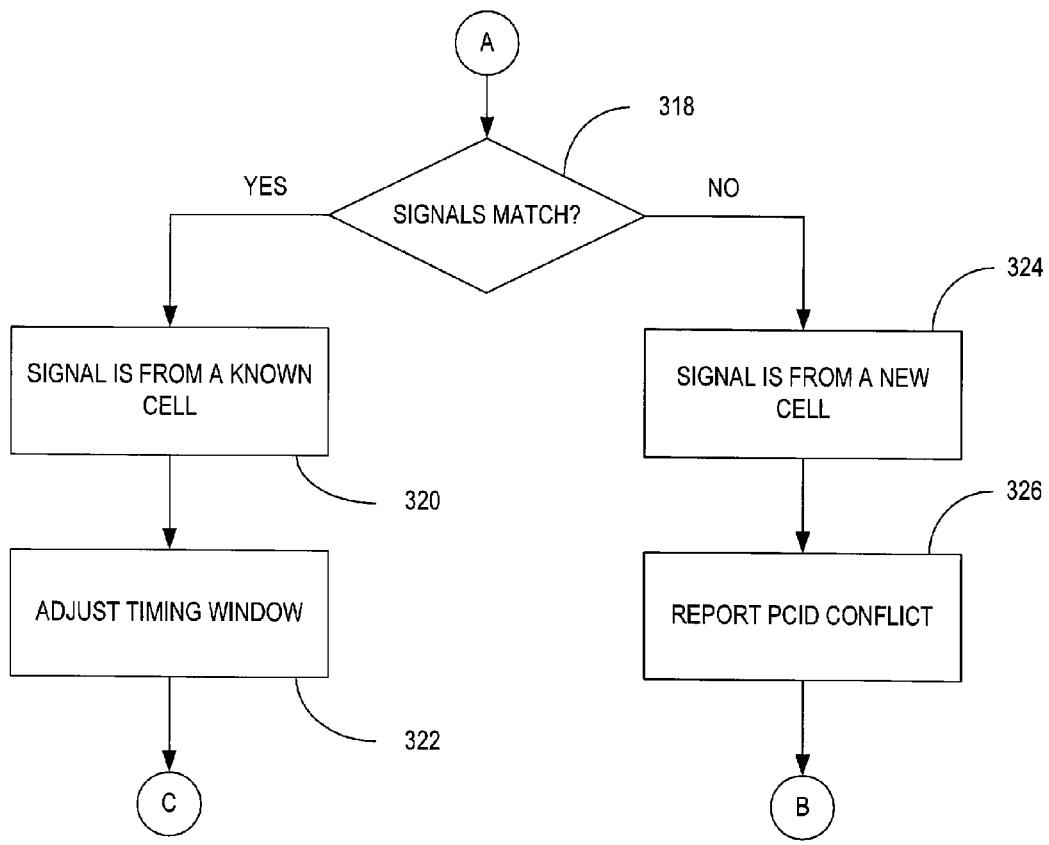

FIGS. 7A and 7B illustrate an exemplary search method 300 implemented by a user terminal 100 that enables the user terminal 100 to detect PCID conflicts. User terminal 100 continuously tracks the timing of known cells 12 (block 302). The timing of the known cells 12 may be tracked, for example, by correlating to the synchronization symbols transmitted on the primary synchronization channel (P-SCH) and/or secondary synchronization channel (S-SCH) transmitted at regular intervals in LTE networks. Each cell 12 has an allowed timing window during which multipath components may be received. Typically, the timing window is the same length or slightly larger than the cyclic prefix used in LTE.

The user terminal 100 also periodically searches for new signal sources (block 304). Cell searching algorithms are well known in the art and are therefore described only briefly herein. To assist the user terminal 100, each cell 12 provides a primary synchronization signal and a secondary synchronization signal on the downlink. During an initial step of the cell search procedure, user terminal 100 performs match filtering between the received signal and the known primary synchronization sequences. Peaks in the output of the matched filter indicate the presence of a signal source and provide coarse timing. Once the coarse timing is acquired, the user terminal 100 correlates to the secondary synchronization signal to acquire the frame timing and cell ID.

When a new signal is detected, user terminal 100 determines the cell ID and timing delay of the detected signal (block 308). Those skilled in the art will appreciate that the cell ID and timing are acquired from the primary synchronization and secondary synchronization signals. The cell ID of the signal is checked against a list of known cells 12 which is stored by the user terminal 100 (block 310). If the cell ID is not included in the known cell list, the signal is assumed to be from a new cell 12, which is added to a known cell list (block 312), and the process continues. If the cell ID of the detected signal matches the cell ID of a known cell 12, the timing of the detected signal is compared to the timing of the known cells (block 314). If the timing of the detected signal falls within the timing window of a known cell 12, it is assumed that the detected signal is from a known cell 12 and the process continues.

If the timing of the detected signal source falls outside the timing window of the known cells 12 having the same cell ID (block 314), the user terminal 100 compares the detected signal with corresponding signals received from the known cell 12 (block 316). The detected signal can be compared with the received signal from a known source in several ways. For example, user terminal 100 may correlate OFDM symbols in the detected signal with corresponding OFDM symbols in the received signal. If there is a high correlation, it is likely that the detected signal originates in the known cell 12. If the correlation is low, it is likely that the detected signal originates from a new cell 12. Therefore, a decision can be made by comparing the correlation result with a predetermined threshold. Due to intersymbol interference (ISI), the correlation result is likely to include a large amount of noise. The threshold may, therefore, be determined by estimating the signal-to-noise ratio for the respective signals.

If the detected signal matches a signal from a known cell (block 318), it is determined that the detected signal source is from a known cell 12 (block 320). In this case, the user terminal 100 adjusts the timing window for the known cell 12 (block 322). If the signals received from the detected signal source does not match the signals received from the known cell 12 with the same cell ID (block 218), it is determined that the detected signal is from a new cell (block 224). Because this situation typically means that two neighbor cells share the same cell ID, the user terminal 100 reports the PCID conflict to the serving base station 20 as previously described and adds the detected signal source to a known cell list (block 312). This procedure is described more fully in U.S. patent application Ser. No. 12/354,052 filed on 1 Jan. 2009, which is incorporated herein by reference.

In WCDMA systems, comparison of signals from the detected signal source and a known cell 12 can be done by despreading the received signals at a time instant corresponding to the detected timing t1 and correlating the despread signals from the detected signal source with the despread signals from the known cell 12, despread at a time instant corresponding to the known cell timing t0. The user terminal 100 can then compare the correlation result with a threshold as previously described. Alternatively, user terminal 100 could decode the signals and compare the decoded symbols.

Figure 8:
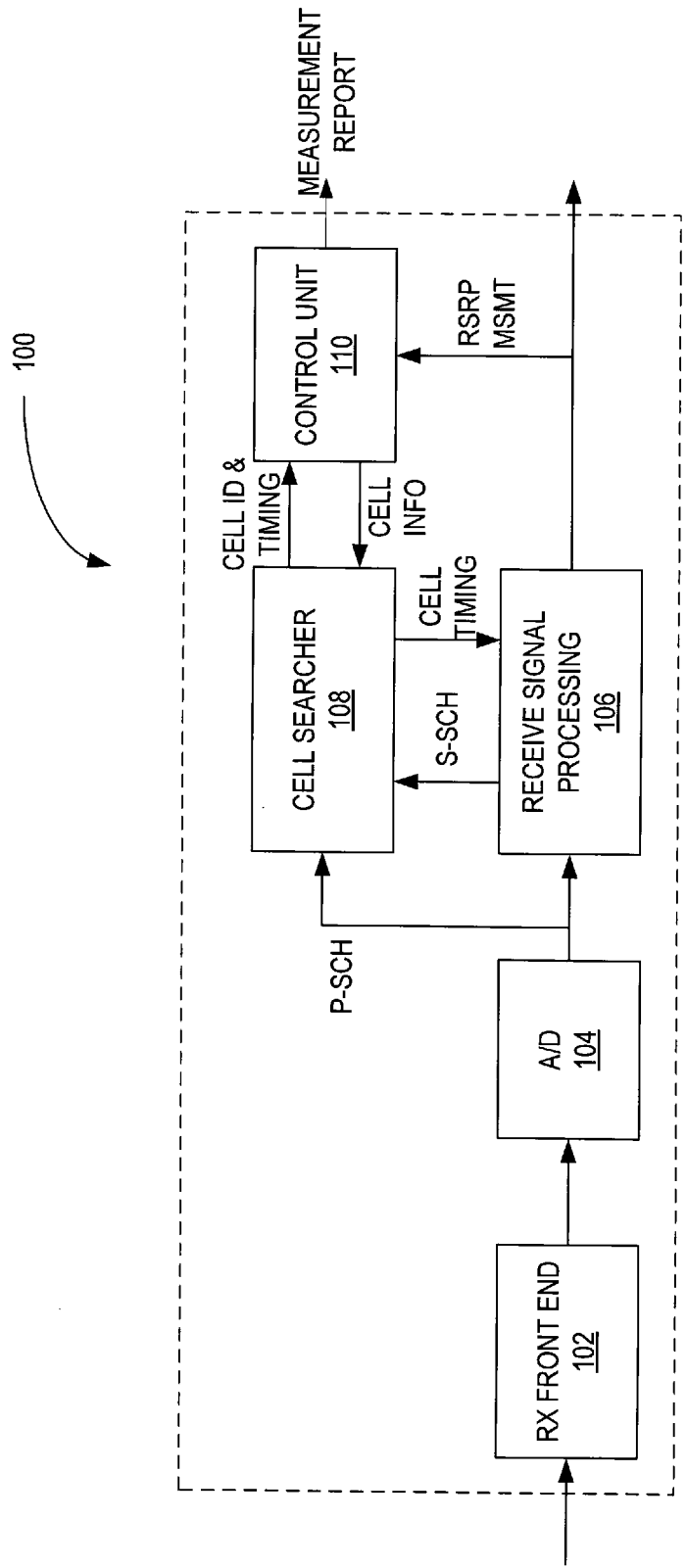
FIG. 8 illustrates an exemplary user terminal for detecting PCID conflicts between two neighboring cells and reporting the PCID conflict to a base station in a serving cell.

FIG. 8 illustrates an exemplary user terminal 100 capable of detecting a PCID conflict. User terminal 100 comprises a receiver front end 102, analog-to-digital converter 104, receive signal processor 106, cell searcher 108, and control unit 110. Receiver front end 102 amplifies, filters, and down-converts received signals to baseband frequency. Analog-to-digital converter 104 samples the received signals and converts the received signals into digital samples for input to the receive signal processor 106. Receive signal processor 106 processes the received signals in a known manner. Such processing includes demodulation and decoding. The receive signal processor 106 also performs RSRP measurements and provides the RSRP measurements to the control unit 110 to be reported to the base station 20. Cell searcher 108 provides timing for known cells 12 to the receive signal processor 106.

The receive signal processor 106 FFT processes the secondary synchronization channel (S-SCH) and provides the output to the cell searcher 108.

The primary function of cell searcher 108 is to detect new cells 12. The cell searcher 108 provides the cell IDs and timing for detected signals to the control unit 110. Control unit 110 compares the cell IDs to a list of known cells 12. If the cell ID does not match a known cell 12, the control unit 110 adds the cell ID to the known cell list, which is stored in memory of the user terminal 100 (not shown). If the cell ID matches a known cell 12, control unit 110 determines whether the detected signal is from a known cell 12 or a new cell 12 as described above. The control unit 110 also generates and sends measurement reports. If a conflict is detected, the control unit 110 generates a measurement report with a PCID conflict indication as previously described.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method implemented by a serving base station in a mobile communication network of resolving cell identifier conflicts, said method comprising:
    receiving, from a user terminal, a Reference Signal Received Power (RSRP) measurement report, said RSRP measurement report including a received power of a reference symbol and an indication of a conflict between the cell identifier of the serving base station and a cell identifier of a neighboring base station, said conflict being detected by the user terminal; and
    automatically changing the cell identifier of the serving base station to resolve the cell identifier conflict.

2. The method of claim 1 further comprising sending measurement control information to the user terminal to configure RSRP measurement reporting by the user terminal to enable the user terminal to report RSRP measurements associated with the cell identifier of the serving base station.

3. The method of claim 2 wherein the measurement control information comprises a neighbor cell relation list including the cell identifier of the serving base station to indicate that the user terminal should report RSRP measurements associated with the cell identifier of the serving base station.

4. The method of claim 1 wherein automatically changing the cell identifier of the serving base station to resolve the cell identifier conflict comprises:
    acquiring a neighbor cell relation list from one or more neighboring base stations;
    determining an unused cell identifier based on the acquired neighbor cell relation lists; and
    changing the cell identifier for the serving base station from a current cell identifier to the unused cell identifier.

5. The method of claim 4 further comprising:
    sending a change proposal from said serving base station to a central management node proposing a change of the cell identifier for the serving node to the unused cell identifier; and
    receiving a response from said central management node to said change proposal indicting whether said change is allowed.

6. The method of claim 5 further comprising sending a change confirmation from said serving base station to said central management node indicating that the serving base station has successfully changed its cell identifier.

7. The method of claim 1 further comprising sending a change notification message from said serving base station to a central management node and/or one or more base station in neighboring cells indicating that the serving base station has changed its cell identifier.

8. The method of claim 1 wherein automatically changing the cell identifier of the serving base station to resolve the cell identifier conflict comprises:
    receiving a new cell identifier from a central management node that manages cell identifiers for cells in said mobile communication network; and
    changing the cell identifier for the serving base station from a current cell identifier to the new cell identifier received from said central management node.

9. A serving base station in a mobile communication network capable of resolving cell identifier conflicts, said method comprising:
    a transceiver for receiving, from a user terminal, a Reference Signal Received Power (RSRP) measurement report including a received power of a reference symbol and an indication of a conflict between the cell identifier of the serving base station and a cell identifier of a neighboring base station, said conflict being detected by the user terminal; and
    a control unit for automatically changing the cell identifier of the serving base station responsive to the conflict indication to resolve the cell identifier conflict.

10. The serving base station of claim 9 wherein the control unit is further configured to send measurement control information to the user terminal to configure RSRP measurement reporting by the user terminal to enable the user terminal to report RSRP measurements associated with the cell identifier of the serving base station.

11. The serving base station of claim 10 wherein the measurement control information comprises a neighbor cell relation list including the cell identifier of the serving base station to indicate that the user terminal should report RSRP measurements associated with the cell identifier of the serving base station.

12. The serving base station according to claim 9 wherein the control unit is configured to determine relevance of the cell identifier conflict before initiating cell identifier conflict resolution when RSRP measurements associated with the conflicting cell identifier are below a threshold.

13. The serving base station of claim 9 wherein the control unit automatically changes the cell identifier of the serving base station to resolve the cell identifier conflict by:
    acquiring a neighbor cell relation list from one or more neighboring base stations;
    determining an unused cell identifier based on the acquired neighbor cell relation lists; and
    changing the cell identifier for the serving base station from a current cell identifier to the unused cell identifier.

14. The serving base station of claim 13 wherein the control unit is further configured to:
    send a change proposal from said serving base station to a central management node proposing a change of the cell identifier for the serving node to the unused cell identifier; and
    receive a response from said central management node to said change proposal indicting whether said change is allowed.

15. The serving base station of claim 14 wherein the control unit is further configured to send a change confirmation from said serving base station to said central management node indicating that the serving base station has successfully changed its cell identifier.

16. The serving base station of claim 9 wherein the control unit is further configured to send a change notification message from said serving base station to a central management node and/or one or more base station in neighboring cells indicating that the serving base station has changed its cell identifier.

17. The serving base station of claim 9 wherein the control unit automatically changes the cell identifier of the serving base station to resolve the cell identifier conflict by:
   receiving a new cell identifier from a central management node that manages cell identifiers for cells in said mobile communication network; and
   changing the cell identifier for the serving base station from a current cell identifier to the new cell identifier received from said central management node.

18. A method implemented by user terminal of reporting cell identifier conflicts, comprising:
   periodically sending one or more Reference Signal Received Power (RSRP) measurement reports to a serving base station by the user terminal to report a received power of a reference symbol;
   detecting a cell identifier conflict between the serving base station and a neighbor base station; and
   reporting the cell identifier conflict to the serving base station by including an indication of the cell identifier conflict in one of the RSRP measurement reports sent from the user terminal to the serving base station.

19. The method of claim 18 wherein said indication comprises the inclusion of a duplicate cell identifier in the RSRP measurement report.

20. The method of claim 18 further comprising:
   receiving a neighbor cell relation list from a serving base station; and
   reporting RSRP measurements associated with the cell identifier of the serving base station when the neighbor cell relation list includes the cell identifier for the serving base station.

21. The method of claim 20 wherein said indication comprises the inclusion of a serving base station cell identifier in the RSRP measurement report.

22. A user terminal for a mobile communication network capable of reporting cell identifier conflicts, comprising:
   a receiver to receive signals from one or more cells in said mobile communication network; and
   a control unit configured to:
      periodically send one or more Reference Signal Received Power (RSRP) signal quality measurement reports by the user terminal to a serving cell to report a received power of a reference symbol;
      detect a cell identifier conflict between said serving cell and a neighbor cell; and
      report said cell identifier conflict to said serving base station by including an indication of said cell identifier conflict in one of said RSRP signal quality measurement reports sent from the user terminal to said serving base station.

23. The user terminal of claim 22 wherein said indication comprises the inclusion of a duplicate cell identifier in the RSRP measurement report.

24. The user terminal of claim 22 wherein the control unit is further configured to report RSRP measurements associated with the cell identifier of the serving base station when a neighbor cell relation list provided by the serving base station includes the cell identifier for the serving base station.

25. The user terminal of claim 24 wherein said indication comprises the inclusion of a serving base station cell identifier in the RSRP measurement report.

\* \* \* \* \*

UNITED STATES PATENT AND TRADEMARK OFFICE
CERTIFICATE OF CORRECTION

| | | |
|---|---|---|
| PATENT NO. | : 8,838,090 B2 | Page 1 of 1 |
| APPLICATION NO. | : 12/464183 | |
| DATED | : September 16, 2014 | |
| INVENTOR(S) | : Gunnarsson et al. | |

It is certified that error appears in the above-identified patent and that said Letters Patent is hereby corrected as shown below:

Title page, item (56), under FOREIGN PATENT DOCUMENTS, in Column 2, Line 1, delete "WO 2008113373 9/2008".

Specification

In Column 1, Line 46, delete "Global Cell Identity" and insert -- Global Identity --, therefor.

In Column 3, Line 15, delete "3 rd" and insert -- 3rd --, therefor.

In Column 8, Line 33, delete "218)," and insert -- 318), --, therefor.

In Column 8, Line 35, delete "224)." and insert -- 324). --, therefor.

Signed and Sealed this
Sixteenth Day of February, 2016

Michelle K. Lee
*Director of the United States Patent and Trademark Office*